(12) United States Patent
Goodsell

(10) Patent No.: US 6,172,301 B1
(45) Date of Patent: Jan. 9, 2001

(54) RECEPTACLE FACEPLATE

(75) Inventor: John P. Goodsell, Stratford, CT (US)

(73) Assignee: Hubbell Incorporated, Orange, CT (US)

( * ) Notice: Under 35 U.S.C. 154(b), the term of this patent shall be extended for 0 days.

(21) Appl. No.: 09/351,911

(22) Filed: Jul. 14, 1999

(51) Int. Cl.[7] ........................................... H02G 3/14
(52) U.S. Cl. ...................... 174/66; 174/67; 220/241; 220/242
(58) Field of Search ................... 174/66, 67, 55; 220/241, 242, 3.8; D13/156

(56) References Cited

U.S. PATENT DOCUMENTS

| | | |
|---|---|---|
| 1,930,610 | 10/1933 | Despard . |
| 1,975,690 * | 10/1934 | Harrington et al. ................ 40/580 |
| 2,515,820 * | 7/1950 | Clark ..................................... 40/542 |
| 2,625,759 | 1/1953 | Koepke . |
| 2,630,477 * | 3/1953 | Rypinski ............................ 361/644 |
| 3,432,611 * | 3/1969 | Gaines et al. ........................ 174/66 |
| 4,479,317 | 10/1984 | Hanna . |
| 4,707,564 * | 11/1987 | Gonzales ............................. 174/66 |
| 5,180,886 | 1/1993 | Dierenbach et al. . |
| 5,212,899 | 5/1993 | Fandreyer . |
| 5,594,206 | 1/1997 | Klas et al. . |
| 6,026,605 * | 2/2000 | Tippett ............................... 40/725 |

OTHER PUBLICATIONS

*Hubbell Premise Wiring, Inc.*, Full Line Catalog # 1100 R, No Date.
*Hubbell Wiring Devices & Systems KELLEMS® Wire Management Marine Wiring Products*, Catalog 2000, 1995, pp. G20, G56–G–57. No Date.

\* cited by examiner

*Primary Examiner*—Dean A. Reichard
*Assistant Examiner*—Dhiru R Patel
(74) *Attorney, Agent, or Firm*—Alfred N. Goodman; Jeffrey J. Howell

(57) ABSTRACT

A faceplate cover includes a window to view circuit indicia. The window is transparent, and allows a user to view indicia which may be present on a receptacle or other device contained in an electrical box. The window is attached to the main panel of the faceplate cover. The faceplate cover and window may be injection molded separately and assembled, or formed utilizing a two shot process.

25 Claims, 3 Drawing Sheets

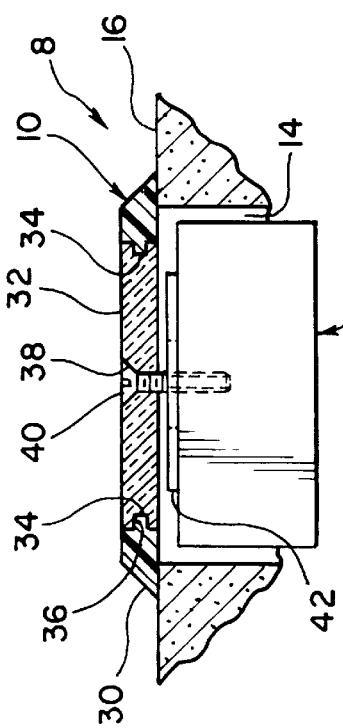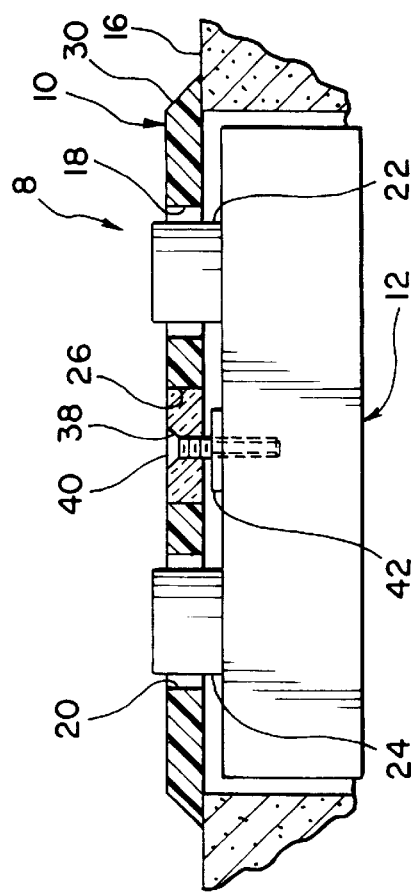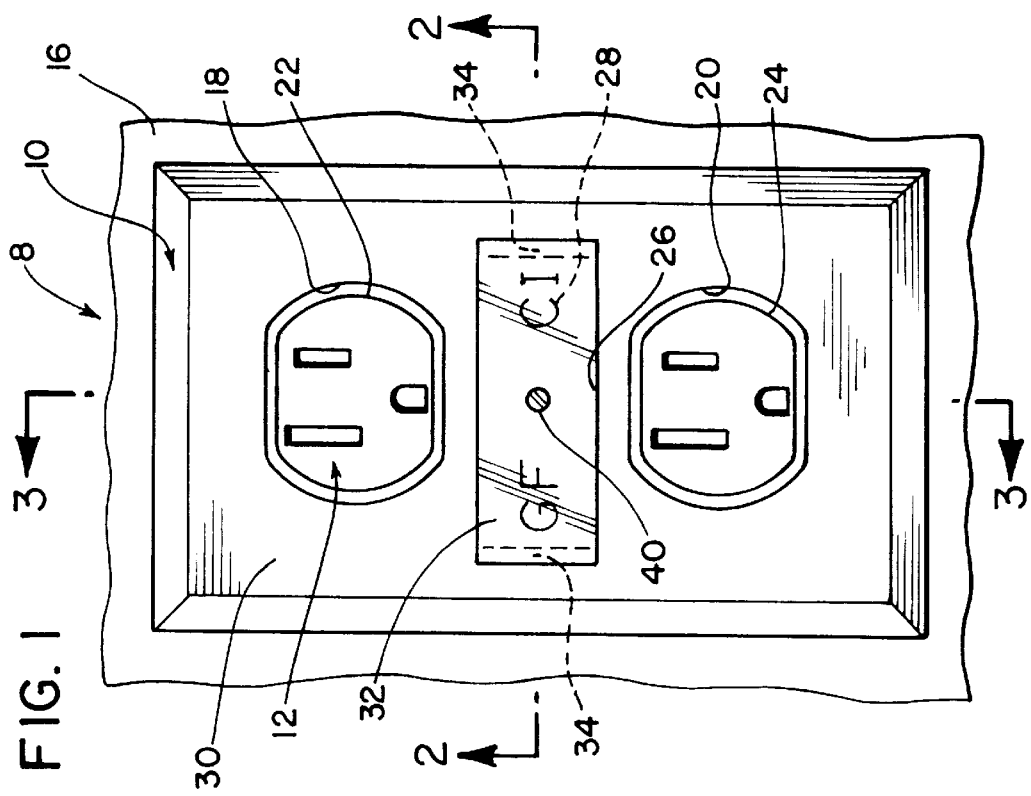

RECEPTACLE FACEPLATE

FIELD OF THE INVENTION

The invention relates to an electrical faceplate cover assembly. More particularly, the invention is directed to a faceplate cover having a transparent window incorporated into the faceplate such that indicia marked on the device being covered by the faceplate is visible. Such indicia may include circuit information.

BACKGROUND OF THE INVENTION

Conventional faceplate covers are generally placed over wall apertures to protect a user from accidentally contacting an electrical circuit, as well as to beautify the wall aperture. Faceplates typically have apertures formed therein to allow switches, receptacles, phone jacks, data ports, video connectors and the like to pass through. With so many kinds of receptacle, switches and ports routed through wall apertures, it has become increasingly difficult to determine the routing, or type of circuit, that is being covered by a faceplate.

One such solution has been to attach removable labels to the outside of the faceplate cover at the time it is installed. The drawback to this exterior labeling schema is, for example, that the labels can fall off, the labels are not attractive, or the labels do not accurately reflect the nature of the wiring.

Another labeling solution is to use faceplates having permanently marked indicia. For example, if the receptacle is a ground fault circuit interrupter, or GFCI, the faceplate cover can be imprinted with "GFCI PROTECTED". However, these are costly specialty items that need to be ordered ahead of time, and real-time changes to wiring plans during the buildout of a space can lead to the need for faceplates having different pre-marked indicia.

With the increase in the number of wired outlets in the home and office, for example, phone/data lines for computers, etc., it is becoming increasingly important to properly label and identify the nature of the receptacle or access port. Many of the wires are labeled with attached tags, or labels placed directly on the receptacle, jack, port, or the like, which are hidden behind faceplate covers.

Examples of prior art receptacles and faceplates are shown in U.S. Pat. Nos. 5,594,206 to Klas et al., 5,212,899 to Fandreyer, 5,180,886 to Dierenbach et al., 4,479,317 to Hanna, 2,625,759 to Koepke, and 1,930,610 to Despard.

Accordingly, there exists a need for a faceplate cover that will allow rapid identification of a receptacle, jack, port and the like following installation of the faceplate cover. Additionally, there exists a need for rapid identification of the circuitry behind a faceplate cover. This invention addresses these needs as well as other needs, which will become apparent from this disclosure.

SUMMARY OF THE INVENTION

One object of the present invention to provide a faceplate cover that allows for the identification of the circuit behind the cover without removal of the cover.

Another object of the invention is to provide a faceplate cover that has a transparent window, allowing a user to visually observe markings situated on or attached to a device behind the cover.

Another object of the invention is to provide a faceplate cover having a cover plate fabricated with an aperture and a transparent window fastened to the cover plate and occupying the aperture.

The foregoing objects are basically attained by providing a covering plate comprising a main portion having a first surface and a second surface, the first and second surfaces being opposite to each other wherein the first surface faces in a first direction and the second faces in a second direction opposite to the first direction; a mounting member to mount the main portion to an object; an aperture extending completely through the main portion, the aperture allowing the object to be visible through the main portion; and a transparent member having a first and second attaching ends connecting the transparent member to the main portion within the aperture, the aperture extending the entire distance between the first and second attaching ends.

The objects are further attained by providing a cover plate assembly comprising an apparatus to be covered having indicia; a covering plate coupled to the apparatus and having a main portion with first and second surfaces, the first and second surfaces opposite each other, wherein the first surface faces in a first direction and the second surface faces in a second direction, the covering also having an aperture and a transparent member, the aperture having walls extending completely through the main portion from the first surface to the second surface and the transparent member being positioned within the aperture, the transparent member being aligned with the indicia and positioned over the indicia so that the indicia can be viewed through the covering plate.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

Referring now to the drawings which form a part of this original disclosure:

FIG. 1 is a front elevational view of a first embodiment of a faceplate cover of the present invention covering a receptacle, which is attached to a wall;

FIG. 2 is a cross-sectional view taken along line 2—2 of FIG. 1;

FIG. 3 is a cross-sectional view taken along line 3—3 of FIG. 1;

DETAILED DESCRIPTION OF THE INVENTION

Figure 5:
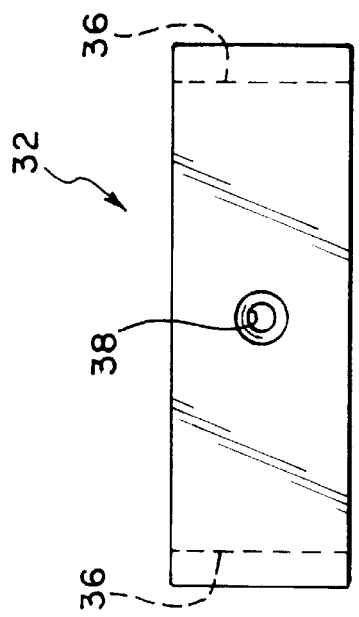
FIG. 5 is a front elevational view of a faceplate window insert for a faceplate cover of the present invention.
Figure 6:
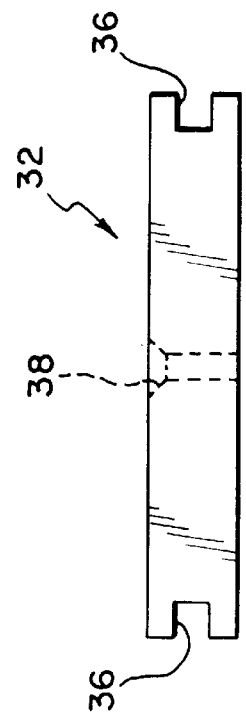
FIG. 6. is a side elevational view of the faceplate window insert of the present invention.
Figure 4:
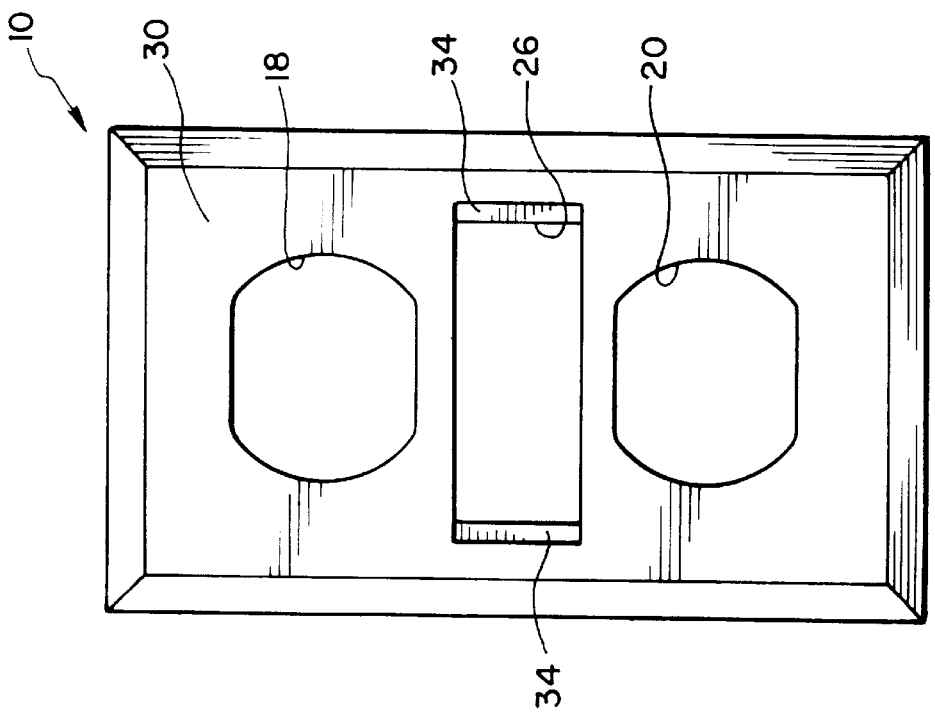
FIG. 4 is a front elevational view of a faceplate cover according to the first embodiment of the present invention for covering a receptacle.

As seen in FIGS. 1–3, a covering plate assembly 8 is shown. The covering plate assembly 8 has a faceplate 10 for a receptacle 12 with indicia 28 mounted in a wall aperture 14 in a wall 16. The receptacle 12 has two outlets 22, and, except for the indicia 28, can be any standard three prong duplex receptacle. It will be understood by those skilled in the art that except for the indicia 28, receptacle 12 can be any electrical device mounted in a wall 16, for example, a plug receptacle, a wall switch, a motion sensor, a thermal sensor, a night light, or any other electrical device be connected to a wall aperture.

Wall 16 can be any conventional interior or exterior wall material, for example, plaster board, wall board, wood, brick, tile, or any other common wall material.

Faceplate 10 has a main panel 30 with two faceplate apertures 18, 20 extending completely therethrough which allow for standard electrical outlets 22, 24 to protrude through faceplate 10. A third faceplate aperture 26 also extends completely through faceplate 10 and allows for viewing, through the faceplate 10, indicia 28 which may be present on the receptacle 12. The main portion or main panel 30 and the entire faceplate 10 may be fabricated using any conventional material used in the art for fabricating faceplate covers. For example, the faceplate 10 may be fabricated from plastic, formed using conventional molding techniques.

Within the faceplate 10, a transparent window or member 32 occupies the aperture 26. The window 32 is attached to the main panel 30, and allows a user to view indicia 28 which may be placed on the receptacle 12 or otherwise viewable through the window 32. The window 32 can be attached to the main panel 30 by any conventional attachment means, including adhesives. For example, window 32 is preferably snap fitted into the aperture 26 and window 32 can have indents 36 for interlocking with the faceplate 10. As seen in FIGS. 1–4, aperture 26 has two protrusions 34 extending in towards the middle of aperture 26, from opposite sides. Protrusions 34 are preferably centrally located between the front and rear surfaces of faceplate 12 and are preferably integrally molded as being one-piece with the rest of faceplate 12. Each protrusion 34 is formed to fit snugly within an indent 36. Window 32 is preferably formed of material that is sufficiently resilient to be bent by hand and inserted into window 32 so that when the bending pressure is released, window 32 returns to its original shape and is secured within aperture 26 by protrusions 34. Thus, the snap fit.

A mounting hole 38 can be located through the window 32, and is located approximately in the middle of the window 32, and halfway between the two apertures 18, 20. The mounting hole 38 allows for a fastener 40, for example, a screw, to attach the faceplate cover 10 to the wall receptacle 12. Thus, the connection with the window 32 and faceplate cover 10 is strong enough to sufficiently secure faceplate 10 to receptacle 12.

As seen in FIGS. 3–6, the window 32 is snap fit into the aperture 26. The window 32 may also be injection molded into the main panel 30 and attached as a result of the injection molding process. A protrusion 34 may be present in the aperture 26 extending from the main panel 28. In this manner, the window 32 to be formed about the protrusion 34 and permanently attached to the main panel 30. This one piece injection molding results in a corresponding indent 36 formed in the window 32.

The protrusion 34 and indent 36 may be reversed, such that the protrusions 34 are part of the window 32, and the indents 36 are part of the main panel 30. Additionally, other locking arrangements can be used.

The window 32 may be fabricated from a flexible material, such that the window 32 is removable from the main body 30. Additionally, the window 32 may contain circuit indicia 28, for example, the circuit indicia 28 may be etched, imprinted or otherwise made visible on the window 32. The window 32 may also be tinted to match the esthetics of the main panel 30 and the surrounding environment.

The faceplate 10 with the window 32 can be fabricated using injection molding, and the window 32 may be permanently attached to the main panel 30 or can be removable. For example, the main panel 30 may first be fabricated using injection molding. The window 32 can also be fabricated using injection molding of a polymer that will result in a transparent window 32 that can be inserted into the aperture 26. The two pieces, the main panel 30 and the window 32, are then mechanically assembled. The assembly of the main panel 30 and the window 32 may be removable, for example, a snap fit as previously discussed. For a more permanent assembly, an adhesive may be utilized to join the main panel 30 and the window 32.

Alternatively, a two shot process may be utilized to fabricate the faceplate 10. For example, the main panel 30 can be fabricated using a first material, and the transparent window 32 can be fabricated using a second material into the window aperture portion of the main panel 30. In this manner, the transparent window 32 is formed integrally with the main panel 30. The surrounding hole 38 may also be formed as part of the transparent window 32.

In another example, the main panel 32 can be fabricated using any known means for fabricating faceplates from metal. A transparent window 32 may then be injected molded, either separately or in the main panel 30. If fabricated apart from the faceplate 10, the window 32 will require mechanical assembly into the main panel 30. Therefore, window 32 will need to be flexible enough to snap fit into the faceplate, using fasteners such as indents and protrusions to maintain proper position and orientation, as previously discussed.

In the present invention, indicia 28 indicates that the faceplate 10 is covering an electrical receptacle 12 that is connected to a ground fault circuit interrupter, or GFCI. The indicia 28 describing a circuit in the wall aperture 14 can be on the receptacle 12 in the wall aperture 14. Preferably, indicia 28 is an adhesive label removably or permanently attached to the receptacle 12, adjacent the position of window 32 for clear viewing. Additionally, indicia 28 can be etched, drawn, imprinted, or otherwise marked on a portion of the receptacle 12 that will be visible through window 32. Alternatively, an adhesive label 42 describing the circuit being covered by the faceplate can be removably or permanently attached to the window 32 on the side of the faceplate 10 facing the receptacle 12. The label 42 can be attached to either side of the transparent window 32, however it would be preferred to attach the label 42 to the underside of the transparent window 32 such that the indicia 28 is visible through the transparent window 32. In this manner, the label 42 carrying the indicia is protected from the ambient environment.

Figure 7:
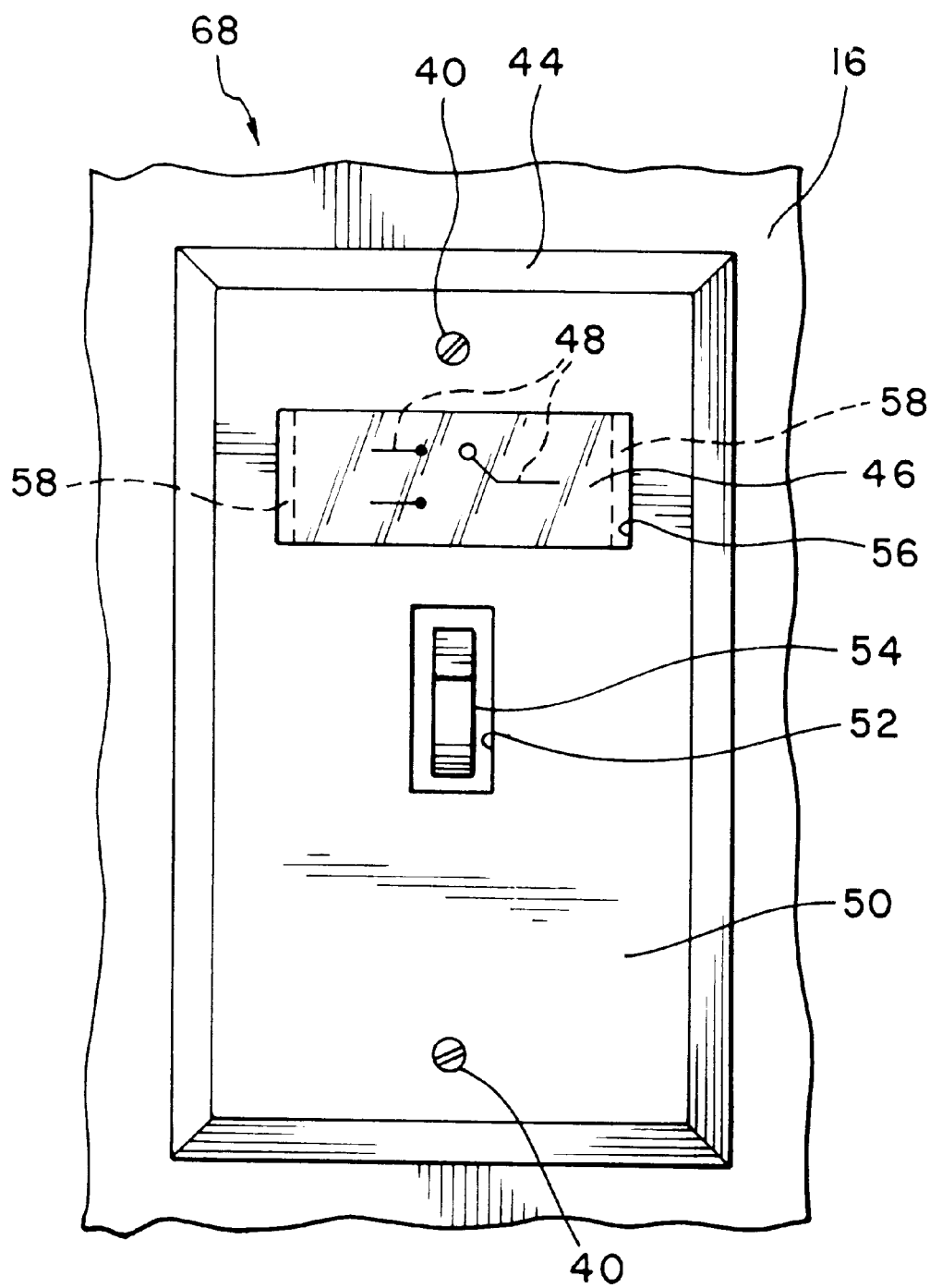
FIG. 7 is a front elevational view of a faceplate cover according to a second embodiment of the present invention, for a wall switch.

FIG. 7 depicts a switch plate cover assembly 68 having a switch plate 44 attached to wall 16 by fasteners 40 covering a switch 54. The switch plate 44 has a transparent window 46 for viewing circuit indicia 48. The second embodiment is substantially identical to the first embodiment, but for a switch 54 protruding through a switch aperture 52, the window 46 no longer being situated in the middle of the switch plate 44, rather above or below the switch aperture 52, and there are no mounting holes through window 46. The main body 50 has an aperture 52 for the light switch 54, and an aperture 56 for receiving the window circuit 46. Aperture 56 has protrusions 58. Aperture 56, as well as its protrusions 58 are substantially identical to those previously discussed with respect to the first embodiment above. Likewise window 46 has indents and window 46 and its indents are substantially identical to window 32 discussed above. As a result, circuit indicia 48 is visible through the transparent window 46.

Indicia 48 is substantially identical to indicia 42 as discussed above. Further, indicia 48 includes a further embodiment in that FIG. 7 illustrates indicia 48 as a circuit diagram. Both indicia 48 and 42 can be diagrams, printing, or both, or any of the other numerous types of indicia known in the art.

It can be readily seen that a transparent window incorporated into a coverplate allows for indicia to be placed on the device contained in a wall aperture and viewed by a user without the removal of the coverplate. This allows for the rapid identification of the circuit or other identifying indicia, and reduces the hazards associated with removal of the coverplate over hot, or electrically active circuits.

Although the invention has been described with respect to a coverplate for a duplex receptacle or a wall switch whereby a user can see through a transparent window portion of the coverplate and circuit indicia is visible, the coverplate can have apertures adapted to allow multiple wall receptacles, multiple switches, phone jacks, cable ports, computer ports, or any other type of electrical or optical connectors to be surrounded.

While advantageous embodiments have been chosen to illustrate the invention, it will be understood by those skilled in the art that various changes and modifications can be made therein without departing from the scope of the invention as defined in the appended claims.

What is claimed is:

1. A covering plate comprising:
    a main portion having a first surface and a second surface, said first and second surfaces being opposite to each other, wherein said first surface faces in a first direction and said second surface faces in a second direction which is opposite to said first direction;
    a mounting member to mount said main portion to an object;
    an aperture extending completely through said main portion, said aperture allowing the object to be visible through said main portion; and
    a transparent member having a first and second attaching ends connecting said transparent member to said main portion within said aperture, and said aperture extending an entire distance between said first and second attaching ends.

2. The plate according to claim 1, wherein said main portion is integrally formed as a one-piece, unitary member.

3. The plate according to claim 2, wherein said transparent member is integrally formed as a one-piece, unitary member.

4. The plate according to claim 3, wherein said main portion and said transparent member are formed of plastic.

5. The plate according to claim 1, wherein:
    said mounting member is a mounting hole in said main portion adapted to receive therethrough a fastener to mount said main portion to said object.

6. The plate according to claim 1, wherein
    said aperture is generally rectangular, with first and second long sides and first and second short sides, and
    said transparent member is generally rectangular, with first and second long sides and first and second short sides.

7. The plate according to claim 6, wherein
    said first and second attaching ends are positioned on said first and second short sides of said transparent member, respectively,
    said first and second short sides of said aperture have first and second coupling ends, respectively, and
    said first and second coupling ends mating with said first and second attaching ends, respectively.

8. A covering plate comprising:
    a main portion having a first surface and a second surface, said first and second surfaces being opposite to each other, wherein said first surface faces in a first direction and said second surface faces in a second direction which is opposite to said first direction;
    a mounting member to mount said main portion to an object;
    an aperture extending completely through said main portion, said aperture allowing the object to be visible through said main portion; and
    a transparent member having a first and second attaching ends connecting said transparent member to said main portion within said aperture, and said aperture extending a entire distance between said first and second attaching ends;
    wherein said aperture is generally rectangular, with first and second long sides and first and second short sides, and
    said transparent member is generally rectangular, with first and second long sides and first and second short sides;
    wherein said first and second attaching ends are positioned on said first and second short sides of said transparent member, respectively;
    said first and second short sides of said aperture have first and second coupling ends, respectively; and
    said first and second coupling ends mating with said first and second attaching ends, respectively;
    wherein each of said first and second attaching ends is a protrusion, and each of said first and second coupling ends is an indent.

9. The plate according to claim 8, further comprising:
    means for passing apparatus through said plate.

10. The plate according to claim 9, wherein said means includes access openings extending completely through said plate between said first and second surfaces.

11. A covering plate assembly, comprising:
    an apparatus to be covered having indicia; and
    a covering plate coupled to said apparatus and having a main portion with first and second surfaces, said first and second surfaces being opposite to each other, wherein said first surface faces in a first direction and said second surface faces in a second direction, which is opposite to said first direction, said covering plate also having an aperture and a transparent member, said aperture having walls extending completely through said main portion from said first surface to said second surface and said transparent member being positioned within said aperture,
    said transparent member being aligned with said indicia and positioned over said indicia so that said indicia can be viewed through said covering plate.

12. The assembly according to claim 11, wherein said apparatus is an electrical receptacle.

13. The assembly according to claim 12 further comprising:
    an electrical box coupled to said receptacle.

14. The assembly according to claim 11, further comprising:
    means for coupling said covering plate to said apparatus.

15. The assembly according to claim 13, wherein said means includes a first mounting hole in said covering plate, a second mounting hole in said apparatus, and a fastener extending through both said first and second mounting holes.

16. The assembly according to claim 11, wherein
said aperture is generally rectangular; with first and second long sides and first and second short sides, and
said transparent member is generally rectangular, with first and second long sides and first and second short sides.

17. The assembly of claim 11, wherein said indicia is a diagram.

18. The assembly of claim 11, wherein said indicia is printing.

19. The assembly of claim 11, wherein said indicia is on a label attached to said receptacle.

20. The assembly of claim 11, wherein said apparatus is a switch.

21. The assembly of claim 11, wherein at least a portion of said apparatus extends through said covering plate.

22. The assembly of claim 11, wherein said transparent member is formed of resilient material such that it is replaceable.

23. The assembly of claim 11, wherein said indicia is attached to said apparatus by adhesive.

24. A covering plate assembly, comprising:
an apparatus to be covered having indicia; and
a covering plate coupled to said apparatus and having a main portion with first and second surfaces, said first and second surfaces being opposite to each other, wherein said first surface faces in a first direction and said second surface faces in a second direction, which is opposite to said first direction, said covering plate also having an aperture and a transparent member, said aperture having walls extending completely through said main portion from said first surface to said second surface and said transparent member being positioned within said aperture,
said transparent member being aligned with said indicia and positioned over said indicia so that said indicia can be viewed through said covering plate;
wherein said aperture is generally rectangular; with first and second long sides and first and second short sides, and
said transparent member is generally rectangular, with first and second long sides and first and second short sides;
wherein said first and second short sides of said transparent member have first and second attaching ends, respectively;
said first and second short sides of said aperture have first and second coupling ends, respectively; and
said first and second coupling ends mating with said first and second attaching ends, respectively.

25. The assembly according to claim 24, wherein each of said first and second attaching ends is a protrusion, and each of said first and second coupling ends is an indent.

* * * * *